UNITED STATES PATENT OFFICE.

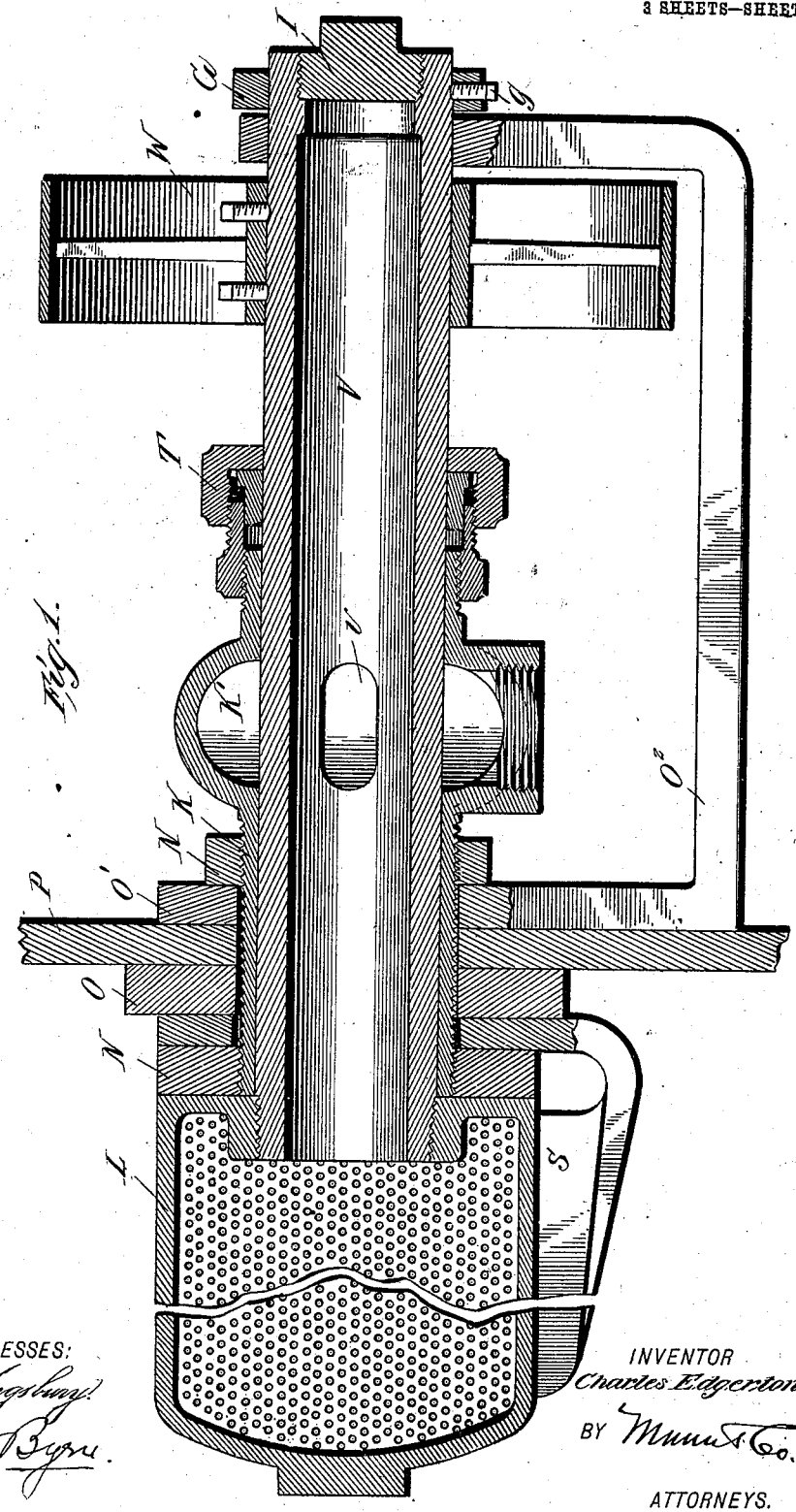

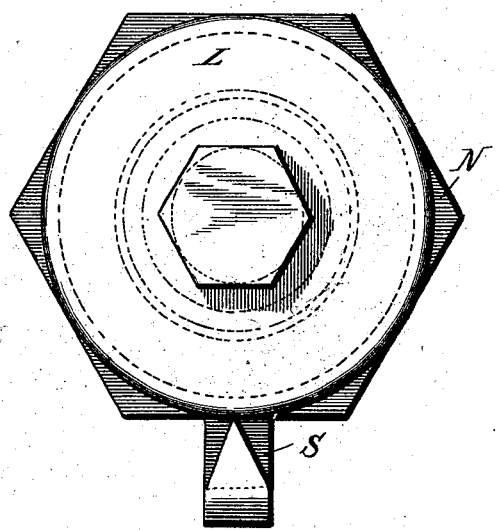
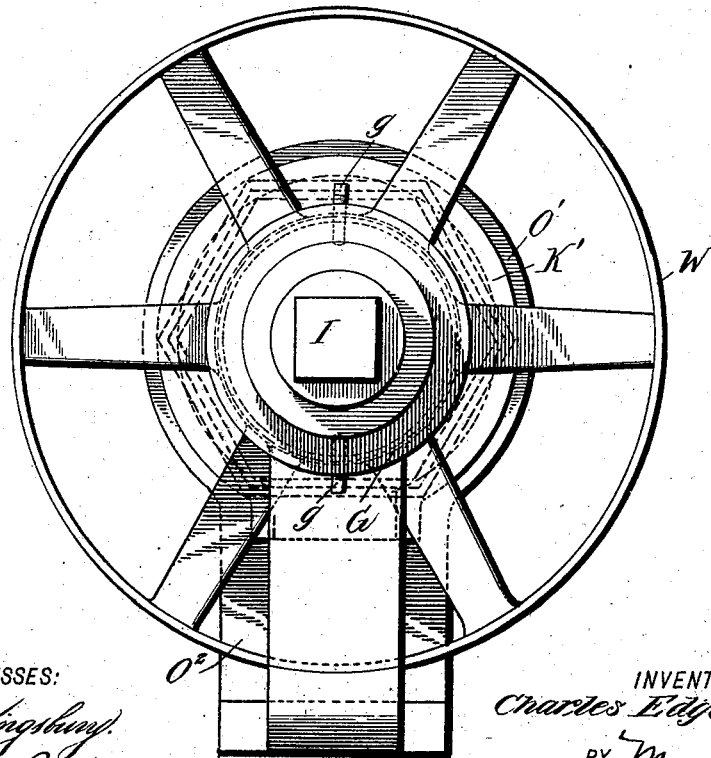

CHARLES EDGERTON, OF PHILADELPHIA, PENNSYLVANIA.

ROTARY STRAINER.

SPECIFICATION forming part of Letters Patent No. 726,658, dated April 28, 1903.

Application filed September 27, 1902. Serial No. 125,103. (No model.)

*To all whom it may concern:*

Be it known that I, CHARLES EDGERTON, of Philadelphia, in the county of Philadelphia and State of Pennsylvania, have invented a new and useful Improvement in Rotary Strainers, of which the following is a specification.

My invention is in the nature of a strainer designed to separate the liquid from semi-liquid or slushy material containing more or less fibrous matter, which is liable to soon obstruct the holes of an ordinary strainer.

My invention is specially designed for removing the oil or grease which rises from garbage, meat scraps, &c., while being cooked or broken up by steam; but it is applicable to many other analogous uses, such as pump-sections or suction-pipes of condensers.

It consists chiefly of a strainer constructed as a perforated chamber combined with means for rotating it and a scraper for scraping the surface of the chamber while being rotated, so as to constantly clear the holes of all materials which have a tendency to plug them up.

It also consists in the special combination of these features with the wall of the tank containing the strainer, the means for supporting and turning the strainer, and in means for taking off the liquid which passes through the rotary strainer, as hereinafter more fully described with reference to the drawings, in which—

Figure 4:
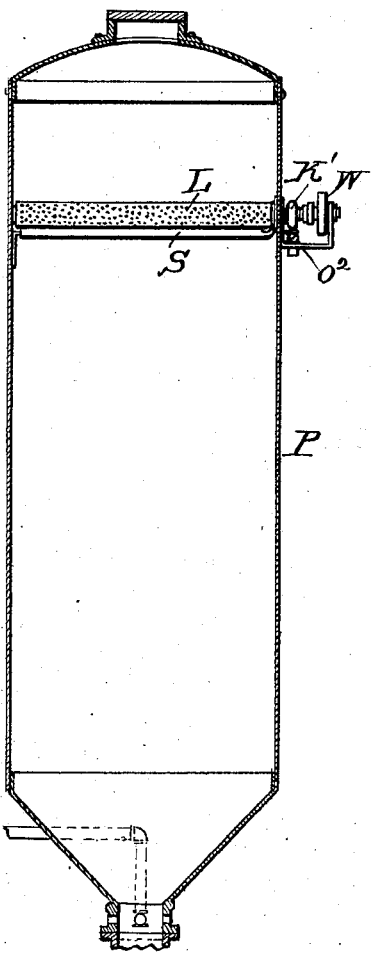
Figure 5:
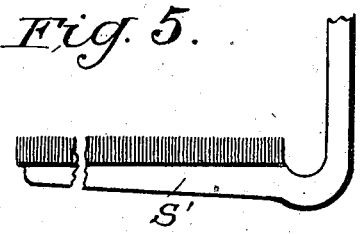

Figure 1 is a vertical longitudinal section through the strainer and the side wall of the tank or digester. Fig. 2 is an end view of the strainer end; Fig. 3, an end view of the opposite end, carrying the driving-pulley. Fig. 4 is a view, on a reduced scale, of my rotary strainer applied to a tank; and Fig. 5 is a detail view of a modification of the scraper.

L is a perforated cylinder which is screwed upon the end of a hollow shaft V, that projects through the side wall P of the cooking-tank or digester.

K is a stationary sleeve embracing the hollow shaft V and screw-threaded upon the outer side. This sleeve has upon the exterior threads a convex and concave washer O and O', which tightly fit against the inner and outer surfaces of the tank-wall to make a tight joint. Against these washers there bear the jam-nuts N N, which screw onto the exterior threads of the sleeve K and compress the washers against the side wall of the tank and also fixedly hold the sleeve K in place in said side wall.

S is a scraper-blade which has a sharp edge which bears against the side of the cylindrical strainer in position parallel to the longitudinal axis of the cylinder. This scraper is formed with a perforated right-angular end, which embraces the fixed sleeve K and is held rigid and stationary thereupon by the jam-nut N.

One of the washers O' is formed with a bracket extension O², which at its outer end is bent up and forms a bearing for the outer end of the rotating hollow strainer-shaft V.

G is a collar fixed by a set-screw $g$ upon the outer end of the rotating hollow shaft outside of the bracket-bearing, and I is a screw-plug which closes the end of the hollow shaft V, but gives access to the interior thereof for cleaning.

W is a pulley rigidly fixed to the strainer-shaft and adapted to connect with a belt for rotating the strainer.

Where the hollow shaft V emerges from the fixed sleeve, a stuffing-box T is located, and just inside the stuffing-box the hollow shaft is formed with one or more lateral openings $v$, which discharge into an enlargement K' of the fixed sleeve. This enlargement is fitted for a pipe-coupling, through which is carried off the liquid that comes through the rotating strainer and the opening $v$ in the hollow shaft.

Now when the rotary strainer-cylinder is immersed in the liquid of the tank power applied through the pulley $w$ or by any other means causes the cylinder and perforated strainer to turn across the sharp edge of the stationary scraper S, which continually cuts and cleans away all fibrous or viscous adhesions to the strainer and keeps the holes open and in effective operative condition, the strained liquid passing continually out through the outlet connection of the enlargement K' of the stationary sleeve K.

This forms a simple and practical device which is sustained by the side wall of the tank and does not become obstructed and inoperative and has a special value in connection with the separation of grease and oil from cooked garbage and all other analogous uses.

In referring to the scraper S, I would have it understood that I do not confine myself to a rigid blade, but may employ a brush S' (see Fig. 5) or any equivalent device for dislodging the clogging materials.

Having thus described my invention, what I claim as new, and desire to secure by Letters Patent, is—

1. The combination with a tank or receptacle, of a hollow perforated strainer having a hollow shaft extending through the wall of the tank, a stationary sleeve with clamping washers and nuts arranged on opposite sides of the wall of the tank and supporting the strainer substantially as described.

2. The combination with a tank or receptacle, of a hollow rotatable strainer having a hollow shaft extended through the side wall of the tank, a fixed and concentric sleeve forming a bearing for said shaft, and a scraper having a perforated end clamped and held upon the said sleeve substantially as described.

3. The combination with a tank or receptacle; of a hollow rotatable strainer having a hollow shaft extended through the side wall of the tank and having an outlet-hole, a fixed sleeve embracing the said shaft and having a chamber surrounding the opening in the shaft, and a fixed scraper for the strainer substantially as described.

4. The combination with a tank or receptacle; of a hollow rotatable strainer having a hollow shaft extended through the side wall of the tank and having a lateral outlet, a fixed sleeve embracing said shaft and having a chamber inclosing the outlet in the shaft, a stuffing-box at the end of the sleeve and surrounding the shaft, and a stationary scraper for the strainer substantially as described.

5. The combination with a tank or receptacle; of a hollow rotatable strainer having a hollow shaft extended through the side wall of the tank, a fixed sleeve clamped to the tank and surrounding the hollow shaft, and a bracket-arm having one end secured to the tank concentrically with the sleeve, and having at its outer end a bearing for the outer end of the shaft substantially as and for the purpose described.

CHARLES EDGERTON.

Witnesses:
C. PFEIFFER, Jr.,
CLIFTON C. DUNKEL.